Figure 1:
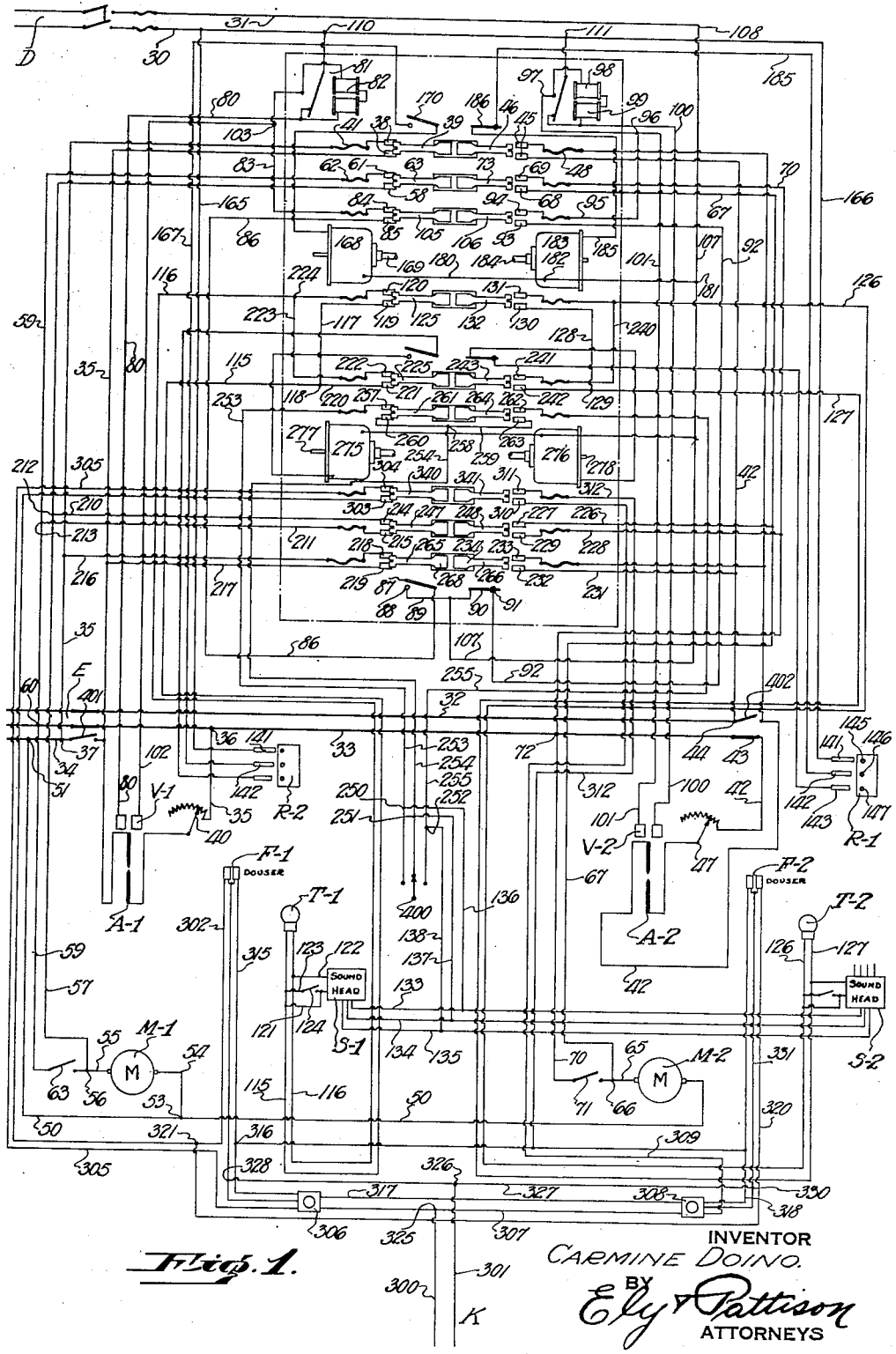

March 17, 1936.  C. DOINO  2,034,176

MOTION PICTURE APPARATUS

Filed Jan. 13, 1933  4 Sheets-Sheet 2

INVENTOR
CARMINE DOINO.
BY
Ely Pattison
ATTORNEYS

March 17, 1936.  C. DOINO  2,034,176
MOTION PICTURE APPARATUS
Filed Jan. 13, 1933     4 Sheets-Sheet 3
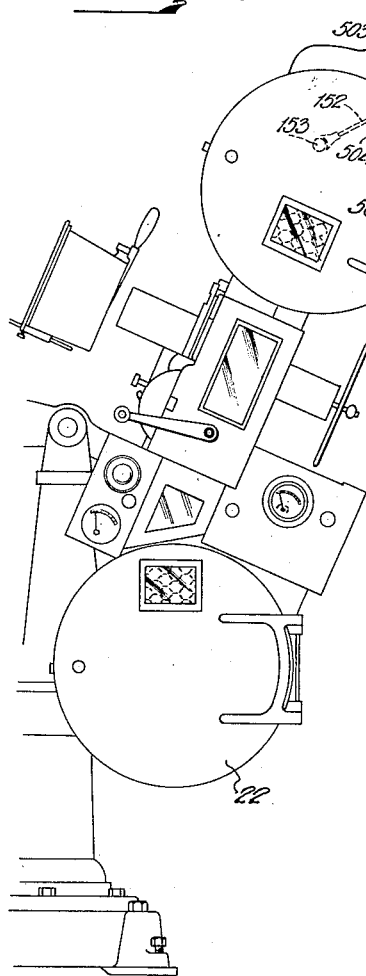
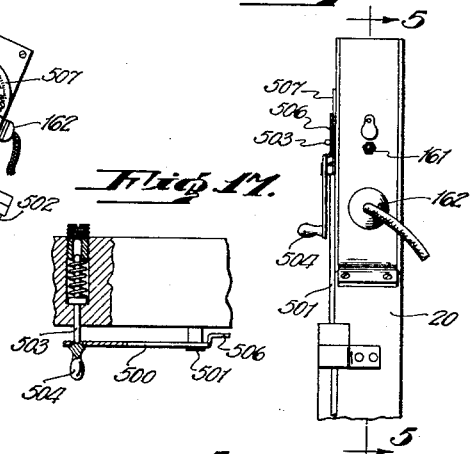
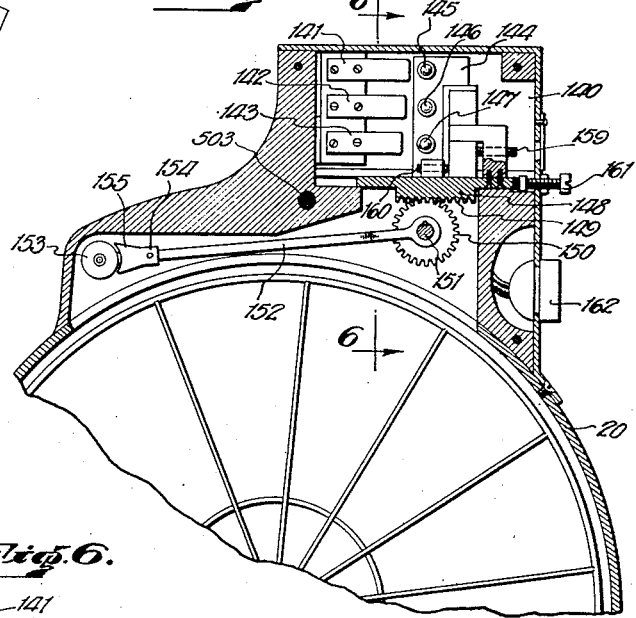
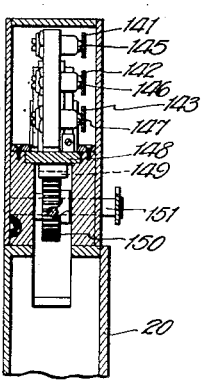
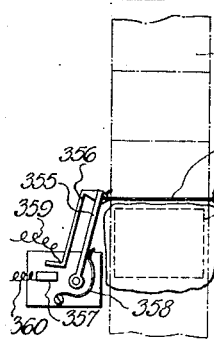
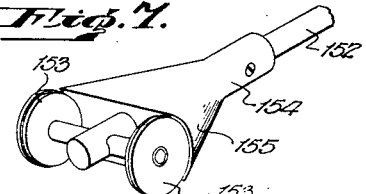
INVENTOR
CARMINE DOINO.
BY
Ely Pattison
ATTORNEYS

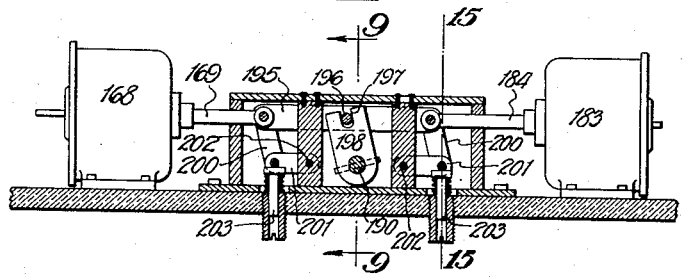
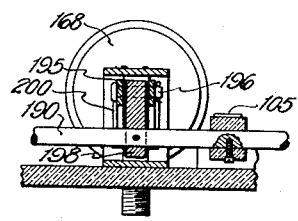
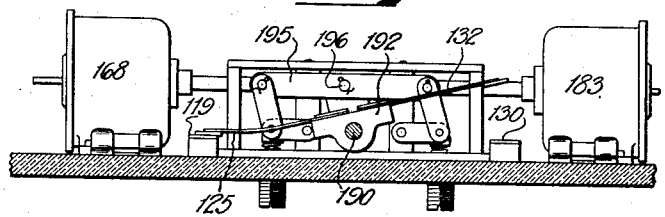
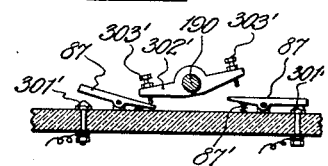
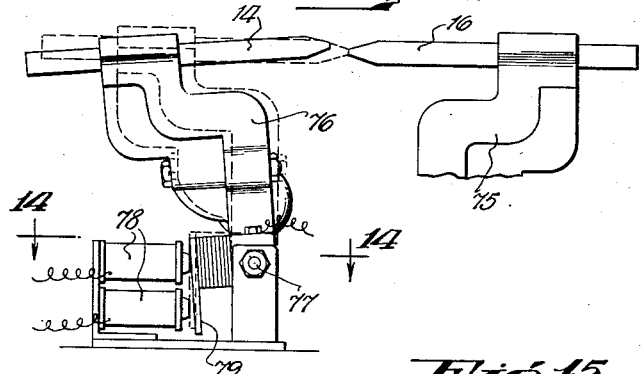
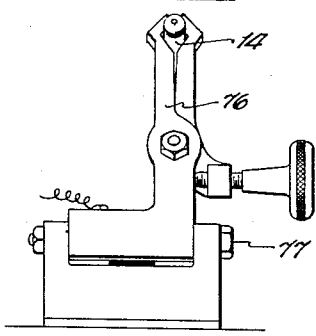
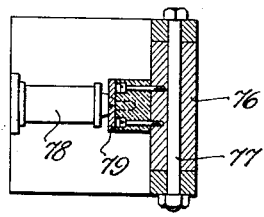
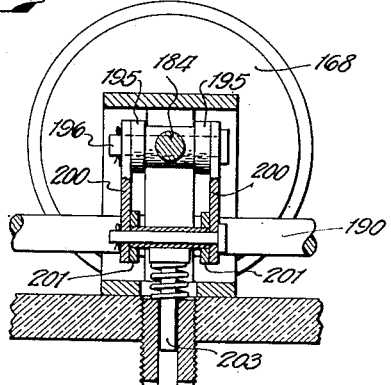

Patented Mar. 17, 1936

2,034,176

UNITED STATES PATENT OFFICE 2,034,176

MOTION PICTURE APPARATUS

Carmine Doino, Brooklyn, N. Y.

Application January 13, 1933, Serial No. 651,509

4 Claims. (Cl. 88—17)

The present invention relates to new and useful improvements in motion picture projection apparatus.

In a prior pending application filed May 26, 1928, Serial Number 280,848, I have illustrated an apparatus for controlling a plurality of picture projectors, which apparatus operates to produce an automatic "change-over". In the operation of motion picture projecting machines it is customary, in order that no interruption in the projection be apparent on the screen, so to operate the machines that the projection by one machine is started before the projection of the other machine has ceased.

In my prior patent application above mentioned this operation is had automatically, and the device of the present invention is an improvement over the apparatus illustrated in my above mentioned prior application.

It is one object of the present invention to improve the construction and mode of operation of picture projecting machines and to provide such machines with mechanism which will effect automatically, the "change-over", entirely independent of an operator except, that the operator is required to remove and replace film reels with relation to the projection machine magazines.

A feature of the invention consists in the provision of novel means whereby a plurality of projecting machines are combined in such a manner that prior to the termination of the film of one machine, the other machine will automatically begin to operate and will continue to operate after the termination of the projection of the first machine. This operation of projection machines is known by operators as the "change-over".

A further feature of the invention resides in the provision of novel mechanism whereby perfect operation of each machine is assured without special attention on the part of the operator.

The light source of projection machines is generally in the form of a so-called carbon arc light and another feature of the invention resides in novel means whereby current is automatically supplied to the arc lights at a pre-determined time together with novel means whereby a perfect operating arc is obtained.

Still a further feature of the invention resides in a new and novel arrangement of parts whereby the amounts of film strip remaining on the film reels in the magazines may be ascertained without necessitating an opening of the magazines.

Other features of the invention relate to certain novel and improved constructions, arrangements and combinations of parts hereinafter described and particularly pointed out in the claims, the advantages of which will be readily understood and appreciated by those skilled in the art.

The invention will be clearly understood from the accompanying drawings illustrating the invention in its preferred form and the following detailed description of the constructions therein shown.

Figure 2:
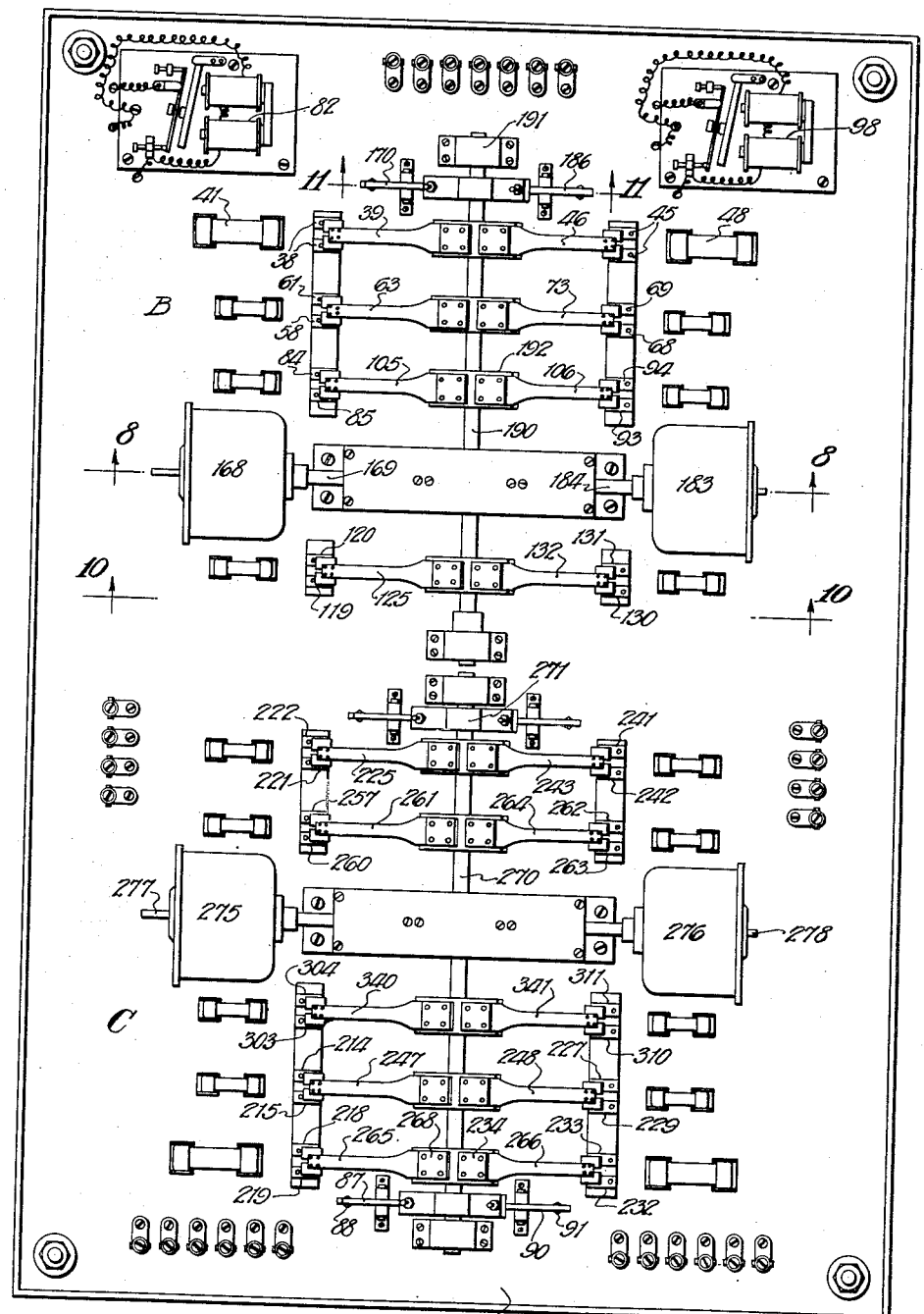

In the drawings:

Figure 1 is a diagrammatic view illustrating the system of wiring by means of which two projection machines are operated to effect an automatic "change-over" from either machine to the other, Figure 2 is a view in elevation of a control panel board, the wiring of the panel board being omitted, Figure 3 is a view in side elevation of a motion picture projector illustrating a device constructed in accordance with the present invention as attached thereto, Figure 4 is a fragmentary view taken at right angles to Figure 3, and showing a portion of the upper magazine of the projection machine, Figure 5 is an enlarged fragmentary sectional view taken on the line 5—5 of Figure 4, Figure 6 is a vertical sectional view taken on the line 6—6 of Figure 5, Figure 7 is a detail perspective view illustrating the specific construction of the film strip contacting member or film follower, Figure 8 is a detail transverse sectional view taken on the line 8—8 of Figure 2, Figure 9 is a vertical sectional view taken on the line 9—9 of Figure 8, Figure 10 is a transverse sectional view taken on the line 10—10 of Figure 2, Figure 11 is a transverse sectional view taken on the line 11—11 of Figure 2, Figure 12 is a fragmentary side elevation of the arc producing magazine, Figure 13 is a view of the arc producing magazine taken at right angles to Figure 12, Figure 14 is a detail sectional view taken on the line 14—14 of Figure 12, Figure 15 is a detail sectional view taken on the line 15—15 of Figure 8, Figure 16 is a detail view illustrating one form of mechanism for the automatic thermal control of the douser, and;

Figure 17 is a fragmentary detail view illustrating a locking and indicating mechanism employed in connection with the upper or supply reel magazine.

Referring in detail to the drawings and more particularly to Figure 3 thereof, A designates a motion picture projector. The machine illustrated is of conventional type and has an upper reel magazine 20 and a lower reel magazine 22.

In operation the film is fed from a reel in the upper magazine 20 to a reel in the lower magazine 22 in the conventional manner.

The film feeding and reeling mechanism is generally effected by a driving mechanism driven by an electric motor neither of which are specifically illustrated herein. The source of light for the projector is generally of the electrical type and in the present illustration of the invention is shown in Figure 12 as of the carbon arc type, the carbons being designated 14 and 16 in said Figure 12. In addition to the foregoing these machines generally include a douser by means of which the projected beam of light may be intercepted to prevent projection thereof to the screen without extinguishing the source of light. In the present illustration of the invention, this douser is electrically operated. In addition, there is a sound device which consists in part of an electric circuit which includes a photo electric cell. The photo electric cell is operated by an exciter light, the circuit of which is independent of that circuit of which the photo electric cell is a part.

In the present illustration of the invention two projecting machines are shown and it is to be understood that the aforementioned devices, that is, the motor, source of projection light, douser and sound mechanism are likewise duplicated, there being one for each projector. Thus, when one projector is operating, its motor, source of light, and sound mechanism will be in operation while these same devices in the other machine, which machine is idle, will not be operated. It is also to be understood that the douser is inoperative in that machine which is operating in order that the light beam may not be intercepted and the projection thereby be interfered with.

The several circuits heretofore referred to are illustrated diagrammatically in Figure 1 of the drawings, the several switches and their particular arrangement being shown in Figure 2 of the drawings. The several switches are mounted upon a panel board 24 and are arranged in two groups designated B and C, the group B controlling the several starting circuits mentioned while the group C controls the several operating circuits heretofore mentioned.

The motor, source of light and exciter light of the sound system, each have two circuits. One of these circuits is energized in connection with each of the aforementioned devices to effect a preliminary operation thereof in order that the operation of an idle projector may be started before an operating projector is thrown out of operation. These circuits in each case will be hereinafter referred to as the starting circuits. The starting circuits having been energized, it will be obvious that the motor of a machine will start its operation, the source of light will become illuminated and the exciter light of the sound mechanism will likewise be illuminated. After an operation of the starting circuit for a predetermined period, it is de-energized in each case and a second circuit in each case is energized, which will continue the operation of the motor, the source of light and the exciter light, and these circuits will be hereinafter referred to as the operating circuits of these various devices.

In addition to the starting circuits heretofore described there is provided means for insuring proper operation of the source of light when the same is in the form of an arc light. This means includes a mechanism for setting up a vibration or intermittent movement of one of the carbons of an arc light relative to the other carbon thereof to insure against the carbons "freezing" and thus short circuiting the circuit of the source of light and rendering the same inoperative. This device is electrical and includes a circuit which is energized during the energization of the starting circuits heretofore described, but which circuit is de-energized upon the de-energization of said starting circuits and the energization of the several operating circuits.

In addition to the motor, source of light and the exciter light of the sound mechanism, there is employed a sound apparatus and a douser. Each of these devices also includes a circuit which is energized subsequent to the de-energization of the several starting circuits and simultaneously with the energization of the operating circuits of said devices.

Thus it will be apparent that proper operation of the device will take place in the following sequence.

For the sake of illustration we will assume that one of the projecting machines is operating. At a predetermined time during this operation, the starting circuits heretofore mentioned of another machine which, it will be understood, is idle, will be energized. This condition will start the motor, energize the source of light circuit and the circuit of the exciter light of the sound mechanism and also the circuit of the vibrating mechanism of one of the carbons of the source of light of this second mentioned machine. After a suitable lapse of time all of these so-called starting circuits will be de-energized and the operating circuits heretofore described will be energized in order to establish operation of the second mentioned machine. In addition, the sound apparatus of the second mentioned machine will be placed in operation through the energization of its circuit and the douser will be moved out of the path of the light beam of said second mentioned machine in order that its projection to the screen may be had. Simultaneous with this operation all of the operating circuits of the various devices of the first mentioned machine will be rendered de-energized in order to render this machine inoperative. After operation of the second mentioned machine for a predetermined period the afore-mentioned operations are repeated and the first mentioned machine is again automatically started into operation, the second mentioned machine being automatically stopped.

The foregoing operations are automatic, the only attention necessary on the part of an operator being to remove reels of film from the film magazines of the several machines and replace them with reels subsequently to be projected.

The present invention contemplates a novel arrangement of switches whereby the conditions above described are automatically established in direct relation to the film in the magazines of the projecting machines. The automatic means by which the several switches are operated is electrical in its operation and is in direct control of the film in one of the film magazines of that machine which is operating.

The several circuits heretofore referred to are illustrated diagrammatically in Figure 1 of the drawings, the several switches and their particular arrangement being shown in Figure 2 of the drawings. The several switches are mounted upon a panel board 24 and are arranged in two groups designated B and C, the group B controlling the several starting circuits mentioned while the group C controls the several operating circuits heretofore mentioned.

In the present illustration of the invention two projecting machines have been illustrated. It is to be understood, however, that the invention is not limited to two projecting machines and that any number of projecting machines may be operatively connected together in accordance with the teachings of the invention.

For the sake of illustration the machines will hereinafter be identified by their motors, that is to say, that no direct reference will be made to the machines.

Referring to Figure 1 of the drawings, the motors of the machines are identified by the reference characters M—1 and M—2, the motor M—1 being the motor of one machine, and the motor M—2 being the motor of the other machine.

In Figure 1 there are two power lines D and E. The circuit of the power line D comprises two legs 30 and 31 while the circuit of the power line E comprises three legs 32, 33, and 34. The sources of light of the two machines are herein illustrated as of the carbon arc light and in Figure 1 these sources of light are designated A—1 and A—2. In Figure 1 of the drawings there are shown two sound apparatuses and these are designated as S—1 and S—2, the exciter lights of these sound apparatuses being designated T—1 and T—2 respectively. As heretofore stated, each projecting machine has a douser and these dousers are designated F—1 and F—2 in the drawings.

Associated with each source of light, there is a vibrator for vibrating one of the carbon electrodes of the source of light to insure against freezing and thereby short-circuiting the light and in Figure 1, these vibrators are designated V—1 and V—2.

Each machine has associated therewith a switch which is controlled by the film in one of the magazines of the machine by which it is carried and in Figure 1 of the drawings these switches are designated R—1 and R—2.

The several control switches for energizing and de-energizing the starting and operating circuits of the several devices are illustrated in Figure 1 of the drawings and these switches and the circuits which they control will now be described.

The motor M—1 is in circuit with the power line E by means of a conductor 50 connected to the leg 34 of the power circuit E as at 51. This conductor 50 extends to the motor M—2 and branching off from said conductor as at 53 there is a conductor 54 connected to the motor M—1. Leading from the motor M—1 there is a conductor 55 and branching therefrom as at 56 there is a conductor 57 terminating in a contact 58. A conductor 59 forms a continuation of the conductor 55 and this conductor is connected to the leg 33 of the circuit E as at 60. This conductor also extends to a contact plate 61 adjacent the contact plate 58 and a fuse 62 is interposed therein. The contacts 58 and 61 are adapted to be bridged by an arm 63 in order to complete the circuit for the motor M—1 which circuit is as follows; leg 34 of the power circuit E, conductor 50, conductor 54, through the motor, conductor 55, conductor 57, contact plates 58 and 61 and conductor 59 to the leg 33 of the power circuit E. The conductor 59 is provided with a manually operated switch 63 by means of which the motor circuit may be energized independently of the circuit just described in which case the motor circuit is as follows: Leg 34 of the power circuit E, conductor 50, conductor 54 through the motor, conductor 55 and conductor 59 to the leg 33 of the power circuit E.

As heretofore stated the conductor 50 also extends to the motor M—2 and leading from the motor M—2 there is a conductor 65 to which is connected as at 66 a conductor 67 which is connected to a contact plate 68. Adjacent the contact plate 68 there is a contact plate 69 and leading therefrom there is a conductor 70 which extends to the point 66 from which the conductor 67 branches. This conductor 70 is connected as at 72 to the leg 33 of the power circuit E and includes a manually operated switch 71. The contact plates 68 and 69 are adapted to be bridged by an arm 73 to complete the circuit to the motor M—2 and when said contact plates 68 and 69 are bridged by the arm 73, the circuit of the motor M—2 will be as follows; leg 34 of the power circuit E, conductor 50, through the motor M—2, conductor 65, conductor 67, contact plate 68, arm 73, contact plate 69 and conductor 70 to the leg 33 of the power circuit at the point 72. The conductor 70 and its switch 71 are for the purpose of supplying current to the motor M—2 independently of the circuit just described and this last mentioned circuit is as follows: leg 34 of the power circuit E, conductor 50 through the motor, conductor 65, switch 71 and conductor 70 to the leg 33 of the power circuit E at the point 72.

From the foregoing it will be apparent that when the arm 63 bridges the contact plates 58 and 61, the circuit to the motor M—1 is completed. When, however, the arm 73 bridges the contact plates 68 and 69, the circuit of the motor M—2 will be completed. It is to be understood that when the arm 63 is in a position to bridge the contact plates 58 and 61, the arm 73 will not bridge the contact plates 68 and 69 and that when the arm 73 bridges the contact plates 68 and 69, the arm 63 will not bridge the contact plates 58 and 61, thus the two starting circuits of the motors M—1 and M—2 cannot be completed at the same time by the automatic device. It is to be understood, however, that each motor is capable of operation through an auxiliary circuit controlled by its respective manually operated switch as heretofore described.

By reference to Figure 1 it will be noted that the arc light A—1 is in a circuit designated by the reference character 35. This circuit is connected as at 36 to the leg 33 of the power line E at one end as at 37 to the leg 34 of the power line E. This circuit includes two spaced contacts 38 which are adapted to be bridged by an arm 39 to establish the circuit 35. A control rheostat 40 and a fuse 41 may be included in this circuit.

The arc light A—2 is included in a circuit 42 which is connected as at 43 to the leg 33 of the power line E and as at 44 to the leg 32 of the power line E. This circuit includes two spaced contact plates 45 which are adapted to be bridged and connected by an arm 46 and this circuit also includes a rheostat 47 and a fuse 48.

From the foregoing it will be apparent that when the arm 39 bridges the contacts 38 the circuit of the arc lamp A—1 will be complete and said arc lamp will function. When, however, the arm 39 does not bridge the contacts 38 the circuit of the arc lamp A—1 will be broken and said lamp will not function. When the arm 46 bridges the contact plates 45 of the circuit 42, the arc lamp A—2 will function and when said arm 46 is out of engagement with the contacts 45, the circuit 42 will be broken and the arc lamp A—2 will not function.

The circuits just described are the so-called starting circuits of the arc lamps. The operating circuits thereof will be described later.

As heretofore stated each arc lamp includes two carbons 14 and 16. The carbon 16 is carried by a stationary bracket 75 as illustrated in Figure 12, the carbon 14 being carried by a pivotally mounted bracket 76, pivotally mounted as at 77 and adapted to move about its pivotal point as indicated in dotted lines in said Figure 12. The reference numeral 78 designates a pair of magnetic coils which are adapted to attract an armature 79 and when these coils have energized and attracted the armature 79 the pivotal bracket will be moved to the dotted line position shown in Figure 12 and when the coils are de-energized, the bracket 76 will move to the full line position illustrated in Figure 12 by the action of gravity. Thus as the coils 78 are alternately energized and de-energized, a vibrating action of the bracket 76 will be had and the carbon 14 will be moved towards and away from the carbon 16 until an operating arc is established. The coils 78 and the armature 79 are diagrammatically illustrated at V—1 and V—2 in Figure 1 and will be hereinafter referred to as the arc vibrating means.

The arc vibrator V—1 is in a circuit which includes a circuit interrupter 81. The circuit interrupter comprises a pair of coils 82 and leading from the coils there is a conductor 83 which is connected to a contact plate 84. Adjacent the contact plate 84 there is a contact plate 85 and leading therefrom there is a conductor 86 which is connected to the throw member 87 of a switch 88. Leading from the contact plate of the switch 88 there is a conductor 89 which is connected to the throw member of a switch 90 from the contact 91 of which there leads a conductor 92 and this conductor 92 is connected to a contact plate 93. Adjacent the contact plate 93 there is a contact plate 94 from which extends a conductor 95 which is connected as at 96 to a conductor 97. This conductor 97 includes a circuit interrupter 98 which likewise comprises coils 99 and leading from the coils 99 there is a conductor 100 which forms one of the legs of the circuit of the arc vibrator V—2. The other leg of the circuit of the arc vibrator V—2 is formed by a conductor 101 and is connected to the conductor 95 at the point 96. The other leg of the circuit of the arc vibrator V—1 is in the form of a conductor 102 which is connected to the arc vibrator V—1 at one end and to the conductor 83 at the point designated 103.

The contact plates 84 and 85 are adapted to be bridged by an arm 105 to complete the circuit to the arc vibrator V—1 while the contact plates 93 and 94 are adapted to be bridged by an arm 106 to complete the circuit to the arc vibrator V—2 it being understood that the conductor 89 is connected with the leg 31 of the power circuit D by a conductor 107 as at 108 and that the armatures of the circuit interrupters are connected to the leg 31 of the power circuit D as at 110 and 111 respectively.

The two sound apparatuses S—1 and S—2 are connected to suitable sound mechanism of which several types are well known in the art and which are not herein illustrated. Each sound apparatus includes, as heretofore stated, an exciter light and these exciter lights are herein designated T—1 and T—2. The starting circuits for these exciter lights will now be described. Leading from the starter light T—1 there are two conductors 115 and 116. The conductor 115 has a branch conductor 117 connected thereto at 118 at one end and to a contact plate 119 at its other end. The conductor 116 is connected to a contact plate 120. The conductors 115 and 116 are connected with the sound apparatus S—1 by conductors 121 and 122 and the conductor 115 is connected to the sound apparatus S—1 by a conductor 123 which includes a switch 124. The contact plates 119 and 120 are adapted to be bridged by an arm 125 to complete the starting circuit of the exciter light T—1.

Leading from the exciter light T—2 there are two conductors 126 and 127. The conductor 127 has a branch conductor 128 connected thereto as at 129 at one end and at its other end to a contact plate 130. The conductor 126 is connected to a contact plate 131 and these contact plates 130 and 131 are adapted to be bridged by an arm 132 to complete the starting circuit of the exciter light T—2. The two sound apparatuses S—1 and S—2 are connected together by suitable conductors 133, 134, and 135. Leading from the conductor 133 there is a conductor 136. Leading from the conductor 134 there is a conductor 137 and leading from the conductor 135 there is a conductor 138. The purpose of these conductors 136, 137, and 138 will be hereinafter referred to.

The switches R—1 and R—2 heretofore mentioned will now be described.

Referring to Figures 4 to 7 inclusive, of the drawings, it will be noted that each of these switches consists of a suitable box or housing 140 supported from and attached to the upper reel magazine 20 of each machine. Inasmuch as these switches are all of the same construction, only one will be described. Carried by the housing 140 there are a plurality of contact plates 141, 142, and 143. The contact plate 141 is longer than either of the contact plates 142 and 143. The contact plate 142 is shorter than the contact plate 141 but longer than the contact plate 143. A member 144 is movable within the housing 140 and this member carries a plurality of contacts 145, 146, and 147. These contacts are adapted to engage their respective contact plates when moved in the direction thereof, that is to say, the contact 145 is adapted for engagement with the contact plate 141; the contact 146 is adapted to engage the contact plate 142, and the contact 147 is adapted to engage the contact plate 143. By reason of the several contacts 145, 146, and 147 being in alignment with each other and the contact plates 141, 142, and 143 being of different lengths, it is obvious that as the member 144 is moved to the left in Figure 5, the contacts 145, 146, and 147 will successively engage their respective contact plates. The member 144 is mounted upon a sliding member 148 which is provided on its under face with a rack 149. Meshing with the rack 149 there is a gear 150 mounted upon a shaft 151 which latter is supported by the housing. The gear 150 is keyed to the shaft 151 as is also a follower-arm 152. This follower-arm 152 is provided on its free end with film engaging means preferably in the form of a pair of rollers 153 which rest upon the film. Carried by the follower-arm 152 closely adjacent the film engaging means there is a guard 154 which is preferably flared as at 155 to a point beyond the film engaging rollers 153 in order to prevent interference of the rollers with the spokes of the film carrying reel as the same is rotated and the film follower-arm and its film engaging means passes between the spokes as the film is unwound from the reel.

With the parts in the position in which they are illustrated in Figure 5, it will be obvious that the position of the film follower-arm is such that the member 148 which carries the member 144 will be so positioned that the contacts 145, 146, and 147 will be out of engagement with their respective contact plates 141, 142, and 143. When, however, the film is unwound from the reel and the film follower-arm approaches the center of the reel, the member 148 will be moved to the left and after a pre-determined amount of film has been unwound from the reel the contact 145 will be moved into engagement with its contact plate 141. After a further pre-determined amount of film has been unwound from the reel the contact 146 will engage the contact plate 142 and upon removal of a still further pre-determined amount of film from the reel, the contact 147 will engage the contact plate 143. To provide for the proper operation of the member 144 with films of different lengths, the member 144 is adjustably mounted upon the member 148 and is also capable of adjustable mounting in the housing. The member 144 is adjustable upon the member 148 by means of the screws 159 and 160, and the member 148 is adjustable relative to the housing by means of the screw 161.

The contacts 145, 146, and 147 are electrically connected together. The contact plates 141, 142, and 143 are, however, insulated from each other. The reference numeral 162 designates an electrical coupling whereby the contact plates 141, 142, and 143 and the contacts 145, 146 and 147 are electrically connected with the panel board illustrated diagrammatically in Figure 1.

Referring now to said Figure 1, it will be seen that the contact plate 141 of the switch R—1 is connected to the leg 31 of the power circuit D by a conductor 166 and that the contact plate 141 of the switch R—2 is connected with the leg 30 of the power circuit D by a conductor 165.

By this arrangement it will be obvious that as the member 144 of the switch of either machine is moved to a point where its contact 145 engages its contact plate 141, power will be led into the switch by the conductor connected with the contact plate 141. This, however, will not energize any of the starting circuits heretofore described until further movement of the member 144 takes place.

The contact plate 142 of the switch R—2 is connected by means of a conductor 167 to an electro-magnetic device 168 which has a plunger 169 moved to the left in Figure 1 upon energization of the coils thereof. This conductor has a switch 170 which will be hereinafter referred to. Leading from the electro-magnetic device 168 there is a conductor 180 which is connected to the conductor 107 heretofore described as at 181. This conductor 180 is also connected as at 182 to an electro-magnetic device 183, the plunger 184 of which is moved to the right in Figure 1 upon energization of the coils of said electro-magnetic device.

The contact plate 142 of the switch R—1 is connected by means of a conductor 185 to the electro-magnetic device 183 heretofore mentioned. This conductor includes a switch 186 which will be hereinafter mentioned.

Referring to Figure 11, it will be seen that these switches 170, 186, 88, and 90, each includes a pivotally mounted throw member 87, normally held in engagement with a contact member 301' by a spring 87'. These throw members are held out of engagement with their respective contact members by screws 303' carried by arms 302' which in turn are carried on and operated by the shaft 190.

The electro-magnetic devices 168 and 183 are adapted to rock a shaft 190, see Figure 2. This shaft 190 is mounted in suitable bearings 191 and carries the several contact arms 39, 46, 63, 73, 105, 106, 125, and 132. These several contact arms are carried by suitable blocks 192 of insulating material mounted upon the shaft 190 and as illustrated in Figure 10 they are of a resilient nature so that they will be placed under tension when moved into engagement with their respective contact plates. The several contact arms are moved into engagement with their contact plates by rocking the shaft 190 upon which the blocks 192 are mounted and this is accomplished by the electro-magnetic devices 168 and 183. The plungers 169 and 184 of the magnetic devices 168 and 183 are connected to a link 195 which carries a pin 196, which in turn operates in a recess 197 in an upstanding arm 198 keyed to the shaft 190. Thus as the plunger 169 is moved to the left, the shaft will be rocked in a counter-clockwise direction and as the plunger 184 is moved to the right the shaft 190 will be rocked in a clockwise direction. Depending from each end of the link 195 there is a link 200 connected to a link 201, which links are pivotally mounted to a brace or support 202. These links are adapted to engage spring pressed plungers 203, which plungers serve to accelerate the rocking movement of the shaft 190 and also serve to retain the shaft in the position to which it is rocked by reason of the pivotal points between the plungers and the link 195 passing to opposite sides of the pivotal connections between the links 200 and 201.

Having thus described the several starting circuits and their control mechanism, the operating circuits and their control mechanism will now be described, the description of the operation of the starting circuits being omitted at this time. They will, however, be described in connection with the complete description of operation of the device.

Referring again to Figure 1, it will be noted that conductors 210 and 211 are connected as at 212 and 213 with the legs of the motor circuit of the motor M—1 and also to contact plates 214 and 215. The two legs of the circuit of the arc lamp A—1 are connected by means of conductors 216 and 217 with contact plates 218 and 219.

The conductor 115 heretofore described as one leg of the circuit of the exciter light T—1 is connected by means of a conductor 220 to a contact plate 221. Adjacent this contact plate 221 there is a contact plate 222 which is connected by means of a conductor 223 with the conductor 116 as at 224. The contact plates 221 and 222 are adapted to be bridged by a contact arm 225.

The leg 67 of the motor circuit of the motor M—2 is connected by means of a conductor 226 with a contact plate 227 and the leg 70 of this circuit is connected by means of a conductor 228 with a contact plate 229 adjacent the contact plate 227.

The two legs of the circuit 42 of the arc lamp A—2 are connected by means of conductors 230 and 231 with contact plates 232 and 233 respectively. These contact plates are adapted to be bridged by a contact arm 234.

Leading from the leg 126 of the circuit of the exciter light T—2 there is a conductor 240 which is connected to a contact plate 241, the conductor 127 of this circuit being connected to a contact plate 242. These contact plates 241 and 242 are adapted to be bridged by a contact arm 243.

The two contact plates 214 and 215 are adapted to be bridged by a contact arm 247 and the contact plates 227 and 229 heretofore mentioned are adapted to be bridged by a contact arm 248.

The conductors 136, 137, and 138 heretofore mentioned are connected as at 250, 251, and 252 with conductors 253, 254, and 255 respectively. The conductor 253 is connected with a contact plate 257. The conductor 254 is connected as at 258 to a conductor 259. One end of this conductor 259 is connected to a contact plate 260 adjacent the contact plate 257 and these two contact plates are adapted to be bridged by a contact arm 261. The conductor 255 is connected to a contact plate 262 and the other end of the conductor 259 is connected to a contact plate 263 adjacent the contact plate 262. These two contact plates are adapted to be bridged by a contact arm 264.

The contact plates 218 and 219 heretofore mentioned are adapted to be bridged by a contact arm 265 and the contact plates 232 and 233 heretofore mentioned are adapted to be bridged by a contact arm 266. These several contact arms 225, 264, 247, 248, 265, and 266 are carried by blocks 268 of insulating material which are mounted upon a shaft 270 as illustrated in Figure 2 of the drawings, this shaft being similar to the shaft 190 heretofore described. This shaft 270 is adapted to be rocked in its bearing 271 in order that the contact arms may be engaged with or disengaged from the several contact plates which they are adapted to bridge and to accomplish this purpose there are two electromagnetic devices 275 and 276 which are of the same type as the electro-magnetic devices 168 and 183 heretofore mentioned. As the electromagnetic device 275 is energized, its plunger 277 will be moved to the left and as the electromagnetic device 276 is energized its plunger 278 will be moved to the right.

The reference character K designates a third power line and this power line has two legs 300 and 301. Leading from one of the coils of the douser F—1 there is a conductor 302 which is connected to a contact plate 303. Adjacent the contact plate 303 there is a contact plate 304 and leading therefrom there is a conductor 305 which is connected to a foot switch 306. Leading from the switch 306 there is a conductor 307 which is connected to a foot switch 308. Leading from the foot switch 308 there is a conductor 309 which is connected to a contact plate 310 adjacent which there is a contact plate 311. Leading from the contact plate 311 there is a conductor 312 which is connected to a conductor 313 as at 314. The conductor 313 is connected to a conductor 315 as at 316, the conductor 315 leading from the other coil of the douser F—1 to the switch 306. Leading from the switch 306 there is a conductor 317 which is also connected to the switch 308 and leading therefrom there is a conductor 318 connected to one of the coils of the douser F—2. Leading from the other coil of the douser F—2 there is a conductor 320 which is connected as at 321 with the conductor 302 heretofore mentioned. The leg 300 of the power line K is connected as at 325 to the conductor 307, the leg 301 being connected as at 326 to a conductor 327 which is connected as at 328 to a conductor 329 leading from the douser F—1 to the switch 306 and as at 330 with a conductor 331 leading from the douser F—2 to the switch 308. The contact plates 303 and 304 are adapted to be bridged by a contact arm 340 and the contact plates 310 and 311 are adapted to be bridged by a contact arm 341.

In some instances projecting machines are provided with automatic means for operating the douser in case the film should catch on fire. This mechanism in its most conventional form consists of a fusible link which is located closely adjacent the aperture plate of the machine. Upon fusing of the link the circuit of the douser of the machine is closed and the douser is moved to position where it intercepts the light beam.

In Figure 16 I have illustrated one form of mechanism by which the foregoing result can be accomplished and in said figure, 350 designates the aperture plate of a projecting machine, having an aperture opening 351 therein. The film 352 passes by the aperture opening and adjacent the film there is a fusible link 353. This fusible link 353 is connected to a stationary point 354 at one end and at its other end to an arm 355 of insulating material which carries a contact member 356 adapted to engage a contact member 357. The arm is moved to a position where its contact member 356 will engage the contact member 357 by means of a spring 358. Leading from the contact member 356 there is a conductor 359 and leading from the contact member 357 there is a conductor 360.

It is to be understood that there are two of these mechanisms, there being one for each machine and these mechanisms are diagrammatically illustrated in Figure 1 of the drawing and designated X—1 and X—2.

The operation of the device will now be described.

With the several parts in the position in which they are illustrated in Figure 1, the machine M—1 is in operation, the machine M—2 being idle. This is evidenced by the fact that the operating circuit of the motor M—1 is closed by the contact arm 247, which bridges the contact plates 215 and 214. The circuit of the arc lamp A—1 is energized by reason of the engagement of the contact arm 265 with the contact plates 218 and 219, its sound apparatus is operating by reason of the engagement of the contact arm 225 with the contact plates 221 and 222 and its exciter light T—1 is in operation by reason of the contact arm 125 bridging the contact plates 119 and 120. The switch R—1 of this machine is de-energized by reason of the fact that the follower-arm 152 is held elevated by the presence of film upon the upper reel in the upper reel magazine of this machine. The douser F—1 of this machine is held inoperative by reason of its circuit being closed by the contact arm 340 bridging the contact plates 303 and 304, the contacts 356 and 357 being closed.

With the parts in the described position, the machine M—1 will continue to operate, the machine M—2 being idle because of the fact that its operating motor circuit is open by reason of the fact that the contact arm 248 is disengaged from the contact plates 227 and 229. The circuit of its arc light is broken by reason of the fact that the contact arm 266 is disengaged from the contact plates 232 and 233. Its exciter light T—2 is dead because of the fact that the contact arm 243 is disengaged from the contact plates 241 and 242 and its sound apparatus is dead because of the fact that the contact arm 264 is disengaged from the contact plates 262 and 263.

As the film on the upper reel in the film magazine of the machine M—1 is reduced, the film follower 152 will, through the medium of the shaft 151 and the gear 150, move the member 148 to the left in Figure 1. After a predetermined number of feet of film have been exposed, the contact 145 will be brought into engagement with the contact plate 141 thus connecting the upper circuit D with the switch R—1. Upon the exposure of a further amount of film the contact 146 will be brought into engagement with the contact plate 142 and the upper circuit D will then be connected with the said contact plate 142. This operation immediately energizes the electro-magnetic device 183 and through the medium of its armature 184 the shaft 190 is rocked in a clockwise direction. This movement of the shaft 191 causes the contact arms 46, 73, and 106 to bridge their respective contact plates. This action completes the circuit to the arc A—2 of the idle machine, the circuit to the arc vibrator of the idle machine and the circuit to the motor of the idle machine. It will be understood that by this action the previously idle machine will be ready for operation, its starting circuits having been completed. Upon the exposure of a still further length of film from the machine R—2 the member 144 is moved still further to the left in Figure 5 and the contact 147 is moved into engagement with the contact plate 143. When this takes place, the electro-magnetic device 276 is energized and through the medium of its armature, the shaft 270 is rocked in a clockwise direction. This action of the shaft 270 completes all of the operating circuits by reason of the several contact arms 243, 264, 341, 248, and 266 engaging their respective contact plates. This action completes the operating circuit of the motor, arc lamp, exciter light of the sound mechanism, the sound mechanism and douser of the second machine and at the same time, by reason of the contact arms 225, 261, 340, 247, and 265, disengaging their respective contact plates, the operating circuits of the several devices of the previously operating machine will be de-energized thus rendering the previously operating machine inoperative. The formerly idle machine now operating continues to operate until the film reaches the pre-determined points heretofore described at which time the switch R—2 will operate in the same manner as the switch R—1 previously described to render the machine M—2 inoperative and the machine M—1 operative.

At the time of energization of the several starting circuits of the machine M—2, the switch 186 was moved to open position thus breaking the circuit of the electro-magnetic device 183 and when the operating circuits of this machine were energized, the switch in the circuits of the electro-magnetic device 276 was moved to open position. The switch 170 in the circuit of the electro-magnetic device 168 was, however, closed and the switch in the circuit of the electro-magnetic device 275 was likewise closed.

As the machine M2 continues to operate the afore-described operation is carried out until the switch R—2 operates to first energize the circuit of the electromagnetic device 168 and subsequently the circuit of the electro-magnetic device 275 to render the machine M—1 operative.

The switches 306 and 308 are floor switches in the form of foot treadles and it is obvious that these switches being normally closed, it is only necessary to step upon either of them depending upon which machine is operating to render the douser operative to intercept the light beam and prevent projection thereof to the film, it being understood that the dousers are held in their inoperative position by electro-magnetic devices which are energized when the circuits in which the switches 306 and 308 are energized and that upon de-energizing said circuits by opening the switches 306 and 308 will permit the dousers to move to beam intercepting position.

In Figure 1 I have shown diagrammatically a switch 400 which is of the hand operated type by which the sound circuits may be manually operated and controlled in case of faulty operation of the automatic apparatus and the power circuit E is likewise provided with a switch 401 by which the circuit of the arc lamp A—1 may be manually controlled and operated and the switch 402 by means of which the circuit of the arc lamp A—2 may be manually controlled and operated.

In Figure 17 I have illustrated in detail, means by which the door of the upper reel magazine is locked closed during operation of the machine and for indicating the amount of film at all times upon the reel in the upper reel magazine.

Referring to Figure 17, 500 designates an operating crank secured to the shaft 151. As the film unwinds from the upper reel, the crank 500 moves downwardly to a position across the door 501 to prevent swinging thereof upon its hinge 502. This crank may be held in its upper position by means of a spring pressed plunger 503 which engages the crank 500. The crank may be operated by a handle 504.

In order to insure that the film follower 151 is released, I provide the plunger 503 with a rigid arm 510, a portion of which projects into the path of movement of the door of the upper film magazine to closed position. Thus as this door is closed, the plunger 503 is disengaged from the crank 500 and the film follower released to move by gravity onto the film.

Upon the opposite end of this crank 500, there is a pointer 506 which travels over a scale or set of calibrations 507 to indicate the amount of film remaining upon the reel in the upper magazine.

From the foregoing it will be apparent that the present invention provides a new and novel mechanism for effecting automatically the "change over" from one motion picture projector to another without requiring the attention of an operator except for the purpose of changing reels of films in the machine.

Having thus described the invention, what is claimed as new and what it is desired to secure by Letters Patent of the United States, is:

1. Apparatus of the class described comprising in combination, a plurality of projecting machines, a source of light for each machine, a driving motor for each machine, and means for effecting alternate operation of said projecting machines, said operating means including a starting circuit and an operating circuit for the source of light of each projecting machine, a starting circuit and an operating circuit for the driving motor of each projecting machine, and means controlled by the film in one of said projecting machines for maintaining energized, the operating circuits of both the source of light and the driving motor of said machine, said means also serving to energize the starting circuit of the source of light and driving motor of the other machine and subsequently to simultaneously de-energize the operating circuit of the source of light and the driving motor of the first mentioned machine and the starting circuit of the source of light and driving motor of the second mentioned machine and energize the operating circuit of the source of light and driving motor of the second mentioned machine.

2. Apparatus of the class described comprising in combination, a plurality of projecting machines, a source of light for each machine, a driving motor for each machine, and means for effecting alternate operation of said projecting machines, said operating means including a starting circuit and an operating circuit for the source of light of each projecting machine, a starting circuit and an operating circuit for the driving motor of each projecting machine, and means controlled by the film in one of said projecting machines for maintaining energized the operating circuits of both the source of light and the driving motor of said machine, said means also serving to energize the starting circuit of the source of light and the driving motor of the other machine and subsequently to simultaneously de-energize the operating circuit of the source of light and the driving motor of the first mentioned machine, de-energize the starting circuit of the source of light and driving motor of the second mentioned machine and energize the operating circuit of the source of light and the driving motor of the second mentioned machine.

3. Apparatus of the class described comprising in combination, a plurality of projecting machines, a source of light for each machine, a driving motor for each machine, and means for effecting alternate operation of said projecting machines, said operating means including a starting circuit and an operating circuit for the source of light of each projecting machine, a starting circuit and an operating circuit for the driving motor of each projecting machine, and means controlled by the film in one of said projecting machines for maintaining energized the operating circuits of both the source of light and the driving motor of said machine, said means also serving to energize the starting circuit of the source of light and the driving motor of the other machine and subsequently to simultaneously de-energize the operating circuit of the source of light and the driving motor of the first mentioned machine, de-energize the starting circuit of the source of light and driving motor of the second mentioned machine and energize the operating circuit of the source of light and the driving motor of the second mentioned machine, said last mentioned means including a plurality of electrically controlled two way switches.

4. Apparatus of the class described comprising in combination, a plurality of projecting machines, a source of light for each machine, a driving motor for each machine, and means for effecting alternate operation of said projecting machines, said operating means including a starting circuit and an operating circuit for the source of light of each projecting machine, a starting circuit and an operating circuit for the driving motor of each projecting machine, and means for maintaining energized the operating circuits of both the source of light and the driving motor of said machine, said means also serving to energize the starting circuit of the source of light and the driving motor of the other machine and subsequently to simultaneously de-energize the operating circuit of the source of light and the driving motor of the first mentioned machine, de-energize the starting circuit of the source of light and driving motor of the second mentioned machine and energize the operating circuit of the source of light and the driving motor of the second mentioned machine, and a plurality of mechanical switches associated with a film magazine and operated by the film therein for energizing and de-energizing the circuits of said two-way switches.

CARMINE DOINO.